United States Patent [19]

Koyama et al.

[11] Patent Number: 5,035,856
[45] Date of Patent: Jul. 30, 1991

[54] MAGNETIC RECORDING MEDIUM

[75] Inventors: Noboru Koyama; Yasushi Nakano; Yoshitaka Yasufuku; Setsuko Kawahara; Takemasa Namiki; Shigetoshi Kawabe; Masahiro Umemura, all of Hino, Japan

[73] Assignee: Konica Corporation, Tokyo, Japan

[21] Appl. No.: 475,131

[22] Filed: Feb. 5, 1990

[30] Foreign Application Priority Data

| Feb. 8, 1989 | [JP] | Japan | 1-30484 |
| Feb. 28, 1989 | [JP] | Japan | 1-49207 |
| Mar. 29, 1989 | [JP] | Japan | 1-79308 |
| Mar. 29, 1989 | [JP] | Japan | 1-79311 |

[51] Int. Cl.$^5$ ............................................. G11B 23/00
[52] U.S. Cl. ................................. 428/328; 428/329; 428/694; 428/695; 428/900
[58] Field of Search ............... 428/328, 329, 694, 695, 428/900

[56] References Cited

U.S. PATENT DOCUMENTS

| 4,259,392 | 3/1981 | Suzuki | 428/694 |
| 4,475,946 | 10/1984 | Matsufuji et al. | 428/694 |
| 4,687,704 | 8/1987 | Miyoshi et al. | 428/328 |
| 4,784,895 | 11/1988 | Mizuno et al. | 428/694 |
| 4,865,924 | 9/1989 | Saito et al. | 428/694 |

*Primary Examiner*—Paul J. Thibodeau
*Attorney, Agent, or Firm*—Jordan B. Bierman

[57] ABSTRACT

A magnetic recording medium having plural magnetic layers is disclosed. The uppermost magnetic layer contains an abrasive with an average particle diameter of not more than 0.3 μm, and a magnetic layer other than the uppermost magnetic layer contains an abrasive with an average particle diameter of not less than 0.3 μm. The medium is improved in the electromagnetic conversion characteristics and sliding noise.

11 Claims, No Drawings

5,035,856

MAGNETIC RECORDING MEDIUM

FIELD OF THE INVENTION

The present invention relates to a magnetic recording medium such as a magnetic tape, a magnetic disk or a magnetic floppy disk.

BACKGROUND OF THE INVENTION

In recent years, there is an increasing demand for high-density recording in magnetic recording mediums. In particular, in video tapes, a very high density recording has been required with an increasing demand for making higher the bands of recording frequencies, and hence it has become popular to use a magnetic powder with a smaller particle diameter.

Making the particles of a magnetic material finer to increase its BET value brings about a smoother surface of a magnetic layer, making it possible to carry out high-density recording, and thus bringing about an improvement in electromagnetic conversion characteristics of the magnetic recording medium. The magnetic layer surface made smoother in this way, however, causes an increase in the friction resistance between the magnetic layer and a magnetic head during the traveling of a magnetic recording tape, in particular, a video tape, so that the magnetic layer of the magnetic recording medium may be damaged after its use for a short period of time, resulting in an increase in sliding noise, and also resulting in adhesion of milky-white foreign matters to the magnetic head, which are brought from the tape thus damaged.

In other words, the attempt to improve the electromagnetic conversion characteristics at high frequencies and the attempt to suppress the increase in sliding noise after repeated traveling of the tape and also to suppress the adhesion of the stated milky-white foreign matters are contradictory to each other.

SUMMARY OF THE INVENTION

An object of the present invention is to rectify such disadvantages conventionally involved, to provide a magnetic recording medium that has good electromagnetic conversion characteristics at high frequencies, may cause less sliding noise even after repeated traveling of the tape, and may cause less adhesion of milky-white foreign matters to the magnetic head.

The magnetic recording medium of the present invention comprises a nonmagnetic support and provided thereon a plurality of magnetic layers comprising ferromagnetic powder dispersed in a binder, wherein i) an uppermost magnetic layer of said magnetic layers contains an abrasive with an average particle diameter of not more than 0.3 μm, and ii) a magnetic layer other than the uppermost magnetic layer contains an abrasive with an average particle diameter of not less than 0.3 μm.

DETAILED DESCRIPTION OF THE INVENTION

The magnetic recording mediums commonly have the layer constitution of a subbing layer provided on a support, a magnetic recording medium provided on the subbing layer, a second magnetic layer optionally provided on the first-mentioned magnetic layer, and, at the reverse side of the support, a back layer provided on the subbing layer. The subbing layer is provided for the purpose of improving the adhesion between the magnetic layer or back layer and the support.

In order to improve electromagnetic conversion characteristics, the surface of the magnetic layer is required to be made smooth. On the other hand, in order to suppress the generation of noise, in particular, the sliding noise, and also prevent adhesion of milky-white foreign matters to the magnetic head, the surface of the magnetic layer must be made rough to a certain degree.

The simultaneous satisfaction of the above two requirements can be hardly attained by the provision of a single magnetic layer, and hence the magnetic layer in the magnetic recording medium of the present invention is comprised of multi-layers of two or more layers.

In the magnetic recording medium of the present invention, the uppermost magnetic layer contains an abrasive with an average particle diameter of not more than 0.3 μm, and the magnetic layer other than the uppermost magnetic layer contains an abrasive of not less than 0.3 μm. Of the particles of the abrasive contained in the uppermost magnetic layer, particles with a particle diameter of not less than 1 μm (called "coarse particles") are present at a rate of recurrence of not more than 5%, and the coarse particles contained in the magnetic layer other than the uppermost magnetic layer are present at a rate of recurrence of not less than 5%, in a preferred embodiment. The layer constitution taken in this way for the magnetic recording medium can attain the simultaneous satisfaction of the above two requirements.

In the magnetic recording medium of the present invention, there are no particular limitations on the thickness of the uppermost magnetic layer. An uppermost magnetic layer made to have an excessively large thickness, however, is liable to give no satisfaction on the effect as expected in the present invention. Accordingly, the uppermost magnetic layer may preferably be made to have a thickness ranging from 0.1 to 1.5 μm in usual instances.

In the manufacture of so-called multi-layer magnetic recording mediums, having the layer constitution of two or more layers, methods therefore include a method in which the multi-layers are simultaneously provided using magnetic coating compositions, and a method in which the layers are provided by carrying out coating twice or more times.

The former method is the so-called wet multi-layer coating (i.e., the wet-on-wet coating), and the latter is a method in which a coating step and a drying step are taken layer by layer to form a laminate (i.e., the wet-on-dry coating). The magnetic recording medium of the present invention can be prepared by any of the methods.

Magnetic recording mediums are prepared usually by applying on a support a coating composition comprising powder of a ferromagnetic material (i.e., ferromagnetic powder), a hardening agent, a dispersing aid, an abrasive, a lubricant, a matting agent, an antistatic agent, and other various additives, dispersed in a binder (a binder resin) with optional addition of a suitable solvent, followed by drying.

The ferromagnetic powder used in the present invention includes various ferromagnetic materials including oxide magnetic materials as exemplified by $\gamma\text{-}Fe_2O_3$, Co-$\gamma$-$Fe_2O_3$ such as Co-containing $\gamma\text{-}Fe_2O_3$ or Co-deposited $\gamma\text{-}Fe_2O_3$, $Fe_3O_4$, Co-$\gamma$-$Fe_3O_4$ such as Co-containing $\gamma\text{-}Fe_3O_4$ or Co-deposited $\gamma\text{-}Fe_3O_4$, and $CrO_2$; and metal magnetic powders mainly composed of Fe, Ni or Co as exemplified by Fe, Ni, Fe-Ni alloys, Fe-Co alloys, Fe-Ni-P alloys, Fe-Ni-Co alloys, Fe-Mn-Zn alloys, Fe-Ni-Zn alloys, Fe-Co-Ni-Cr alloys, Fe-Co-Ni-P alloys, Co-P alloys and Co-Cr alloys. Additives to these metal ferromagnetic materials may include elements such as Si, Cu, Zn, Al, P, Mn and Cr, or compounds of any of these. Hexagonal ferrites such as barium ferrite, and iron nitride may also be used.

The ferromagnetic powder preferably used in the uppermost magnetic layer of the magnetic recording medium of the present invention has a coersive force (Hc) of from 750 to 1,200 Oe (oersted), and it is preferred to use a cobalt-containing iron oxide (Co-$\gamma$-FeO$_x$; x=1.4 to 1.5) containing Si. The content of the Si in the magnetic material may preferably be from 0.1 to 2% by weight, and more preferably from 0.1 to 1% by weight.

An Si content less than 0.1% by weight may result in so poor dispersion of the magnetic material in the magnetic coating composition that the electromagnetic conversion characteristics of the magnetic recording medium may be lowered. On the other hand, an excessive content more than 2% by weight may undesirably result in a deterioration of magnetic characteristics such as coersive force of the magnetic material.

When the magnetic material having such a high coersive force (Hc) of from 750 to 1,200 Oe (oersted) is used in the uppermost magnetic layer, the output of the magnetic recording medium at high-frequency bands can be improved and at the same time the output at low-frequency bands can also be enhanced because of the presence of the fist Layer (lower layer). Preferred are magnetic materials having a coersive force of from 800 to 1,000 Oe (oersted).

In a preferred embodiment, the magnetic material in the uppermost magnetic layer is subjected to surface treatment with Si and/or Al, and the uppermost magnetic layer contains magnetic chromium oxide.

In this instance, the content of Si or Al in the magnetic material in the uppermost magnetic layer may preferably range from 0.1 to 1.0 part by weight based on 100 parts by weight of the magnetic material.

The amount of the magnetic chromium oxide used may vary depending on the type of magnetic material used, containing Si or Al, and the content of Si or Al in the magnetic material. It, however, may preferably range from 1.0 to 200 parts by weight based on 100 parts by weight of the magnetic material.

The binder used in the present invention includes polyurethanes, having wear resistance. The polyurethanes have a strong adhesive force to other materials, are mechanically tough against repeatedly applied stress or bending force, and also have good wear resistance and weathering resistance.

In addition to the polyurethanes, cellulose resins, vinyl chloride polymers or copolymers or polyester polymers or copolymers may be used in combination therewith, whereby the dispersion of the magnetic powder in the magnetic layer can be improved to increase the mechanical strength of the layer. Here, use of only the cellulose resins or the vinyl chloride copolymers may make the layer excessively hard. This, however, can be prevented because of the presence of the polyurethanes.

Usable cellulose resins include cellulose esters, cellulose inorganic acid esters, and cellulose organic acid esters. The above vinyl chloride polymers or copolymers and the polyester polymers or copolymers may be partially hydrolyzed. The vinyl chloride copolymers may preferably include copolymers containing vinyl chloride and vinyl acetate.

The polyester polymers or copolymers may preferably include partially hydrolyzed polyester resins.

Phenoxy resins can also be used. The phenoxy resins have the advantages that they have a large mechanical strength, superior dimensional stability, good thermal resistance, water resistance or chemical resistance, and good adhesive properties.

These advantages can supplement or compensate the advantages or disadvantages of the above polyurethanes to remarkably increase the stability with time, of the physical properties of tapes.

In the uppermost magnetic layer of the magnetic recording medium of the present invention, a modified vinyl chloride/vinyl acetate copolymer having a negative functional group and a modified polyurethane having a negative functional group may preferably be used in combination, as the binder (binder resin).

In particular, preferred results can be obtained when a cobalt-containing iron oxide having a coersive force (Hc) of from 750 to 1,200 Oe (oersted) is used as the magnetic material in the magnetic layer.

Use of such a resin makes it possible to improve the dispersion of the magnetic material, and besides, improve the electromagnetic conversion characteristics of the magnetic recording medium.

The modified vinyl chloride/vinyl acetate copolymer having a negative functional group, used in the present invention, refers to the so-called modified vinyl chloride/vinyl acetate copolymer into which a negative functional group has been introduced. This can be readily obtained by allowing a vinyl chloride/vinyl acetate copolymer to react with a compound having a negative functional group and chlorine, as exemplified by

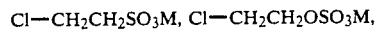
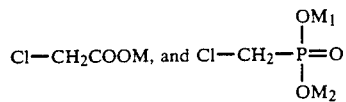

wherein M, M$_1$ and M$_2$ each represent an alkali metal such as lithium, sodium, or potassium, by hydrochloric acid reaction, to effect condensation.

The negative group in the above copolymer typically includes, for example, a sulfonic acid group and a carboxyl group, but is by no means limited only to them.

The modified polyurethane having a negative functional group, used in the present invention, refers to the so-called polyurethane into which a negative functional group has been introduced. This can be readily obtained by allowing a polyurethane to react with a compound having a negative functional group and chlorine, as exemplified by

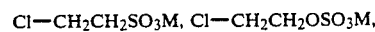
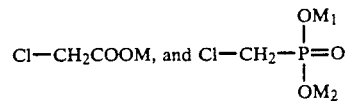

wherein M, M$_1$ and M$_2$ each represent an alkali metal such as lithium, sodium, or potassium, by hydrochloric acid reaction, to effect condensation.

The negative group in the above polymer typically includes, for example, a sulfonic acid group and a carboxyl group.

In addition to the binder described above, an appropriate mixture with a thermoplastic resin, a thermosetting resin, a reactive resin, a resin curable by irradiation with electron rays may also be used.

The magnetic coating composition may contain a hardening agent of various types so that the durability of the magnetic layer in the magnetic recording medium of the present invention can be improved, and may contain, for example, an isocyanate, including aromatic isocyanates or aliphatic isocyanates.

The aromatic isocyanates include, for example, tolylene diisocyanate (TDI), and addition products of such isocyanates with active hydrogen compounds. Preferred are those having an average molecular weight ranging from 100 to 3,000.

The aliphatic isocyanates include hexamethylene diisocyanate (HMDI), and addition products of such isocyanates with active hydrogen compounds. Of these aliphatic isocyanates and addition products of such isocyanates with active hydrogen compounds, preferred are those having an average molecular weight ranging from 100 to 3,000. Of the aliphatic isocyanates, preferred are non-alicyclic isocyanates and addition products of these compounds with active hydrogen compounds.

Dispersants and lubricants are used in the magnetic coating composition used for the formation of the above magnetic layer. Additives such as matting agents and antistatic agents may also be optionally contained therein. The dispersants used in the present invention include phosphoric acid esters, amine compounds, alkyl sulfates, aliphatic acid amides, higher alcohols, polyethylene oxide, sulfosuccinic acid, sulfosuccinic acid esters, known surface active agents, and salts of these. It is also possible to use salts of polymer dispersants having a negative organic group (for example, —COOH). These dispersants may be used alone or in combination of two or more kinds.

The lubricants include silicone oil, graphite, carbon black graft polymers, molybdenum disulfide, tungsten disulfide, lauric acid, and myristic acid. There can be also used fatty acid esters (so-called waxes) comprising a monobasic fatty acid having 12 to 16 carbon atoms and a monohydric alcohol having 21 to 23 carbon atoms in total, including the carbon atom number of said fatty acid ester. These lubricants may be added in an amount ranging from 0.2 to 20 parts by weight based on 100 parts by weight of the binder.

In the present invention, as the lubricants used in the uppermost magnetic layer, at least one kind of compound may preferably be selected, in particular, from oleic acid and stearic acid.

In such an instance, the magnetic material in the uppermost magnetic layer may preferably comprise a cobalt-containing iron oxide (Co-$\gamma$-FeO$_x$) containing Si in an amount of from 0.1 to 2.0 parts by weight based on 100 parts by weight of the magnetic material.

The abrasive is essentially used in the present invention. The abrasive to be used includes the materials commonly used in the art, as exemplified by fused alumina, $\alpha$-alumina, other various kinds of alumina, silicon carbide, chromium oxide, corundum, artificial corundum, artificial diamond, garnet, and emery (main components: corundum and magnetite). In the present invention, it is preferred to use as the abrasive, chromium oxide in the uppermost magnetic layer.

In the uppermost magnetic layer, the abrasive may preferably be added in an amount of from 0.1 to 20.0 parts by weight based on 100 parts by weight of the magnetic material contained in the uppermost magnetic layer; and in the magnetic layer other than the uppermost magnetic layer, in an amount of from 0.1 to 20.0 parts by weight based on 100 parts by weight of the magnetic material contained in that layer.

The abrasive contained in the uppermost magnetic layer may preferably have an average particle diameter of from 0.05 to 0.3 $\mu$m, and particularly from 0.05 to 0.2 $\mu$m. The abrasive contained in the magnetic layer other than the uppermost magnetic layer may preferably have an average particle diameter of from 0.3 to 1.0 $\mu$m, and particularly from 0.35 to 0.9 $\mu$m.

The matting agent includes organic powders and inorganic powders, which may be used alone or in combination of the respective powders.

The organic powders used in the present invention may preferably include acryl-styrene resins, benzoguanamine resin powders, melamine resin powder, and phthalocyanine pigments. It is also possible to use polyolefin resin powders, polyester resin powders, polyamide resin powders, polyimide resin powders, and polyethylene fluoride resin powders. The inorganic powders include silicon dioxide, titanium oxide, aluminum oxide, calcium carbonate, barium sulfate, zinc oxide, tin oxide, aluminum oxide, chromium oxide, silicon carbide, calcium carbide, $\alpha$-Fe$_2$O$_3$, talc, kaolin, calcium sulfate, boron nitride, zinc fluoride, and molybdenum dioxide.

The antistatic agents include conductive powders including carbon black, as well as graphite, tin oxideantimony oxide compounds, and titanium oxide-tin oxideantimony oxide compounds; natural surface active agents such as saponin; nonionic surface active agents of an alkylene oxide type, a glycerol type, or a glycidol type, cationic surface active agents such as higher alkylamines, quaternary ammonium salts, pyridine and other heterocyclic compounds, phosphoniums, or sulfoniums; anionic surface active agents containing an acidic group such as carboxylic acid, sulfonic acid, phosphoric acid, a sulfuric acid ester group, or a phosphoric acid ester group; and amphoteric surface active agents such as amino acids, aminosulfonic acids, end sulfuric acid or phosphoric acid esters of amino-alcohols.

As solvents mixed in the above coating composition, or diluting solvents used when the coating composition is applied, there can be used ketones such as acetone, methyl ethyl ketone, methyl isobutyl ketone, and cyclohexanone; alcohols such as methanol, ethanol, propanol, and butanol; esters such as methyl acetate, ethyl acetate, butyl acetate, ethyl lactate, and ethylene glycol monoacetate; ethers such as glycol dimethyl ether, glycol monoethyl ether, dioxane, and tetrahydrofuran; aromatic hydrocarbons such as benzene, toluene, and xylene; and halogenated hydrocarbons such as methylene chloride, ethylene chloride, carbon tetrachloride, chloroform, and dichlorobenzene.

Materials for the support include plastics as exemplified by polyesters such as polyethylene terephthalate and polyethylene-2,6-naphthalate, polyolefins such as polypropylene, cellulose derivatives such as cellulose triacetate and cellulose diacetate, polyamide, and polycarbonate. It is also possible to use metals such as Cu, Al and Z, and ceramics such as glass, boron nitride and silicon carbide.

The support may have a thickness of from about 3 μm to about 100 μm when it is in the form of a film or sheet, and from about 30 μm to about 10 μm when it is in the form of a disk or card. When it is in the form of a drum, it is used in a cylindrical form. The forms thereof depend on the recorders to be used.

An intermediate layer may be provided between the above support and a magnetic layer so that the adhesion between them can be improved.

Coating methods to form on the support the magnetic layers described above include air doctor coating, blade coating, air knife coating, squeegee coating, impregnation coating, reverse-roll coating, transfer-roll coating, gravure coating, kiss-roll coating, cast coating, spray coating, and extrusion coating, these of which can be utilized without limitation thereto.

The magnetic layers formed on the support by such coating methods are optionally subjected to orientation of the ferromagnetic powder in the layers, and thereafter the magnetic layer formed are dried.

When this orientation is carried out, it may be done in a magnetic field with a magnetizing force of from about 500 Oe to about 5,000 Oe using an alternating current or direct current. The drying may be carried out at a temperature of from about 40° C. to about 120° C., and over a period of about 0.5 minute to about 10 minutes.

As occasion demands, the resulting medium may be subjected to surface smoothening or cut into any desired shapes. The magnetic recording medium of the present invention is thus prepared.

The magnetic recording medium comprising a nonmagnetic support and provided thereon a plurality of magnetic layers, wherein i) a magnetic material contained in an uppermost magnetic layer of said magnetic layers comprises a cobalt-containing iron oxide (Co-γ-FeO$_x$) containing silicon (Si) in an amount of from 0.1 to 2.0 parts by weight based on 100 parts by weight of the magnetic material, and ii) said uppermost magnetic layer contains a lubricant comprising at least one selected from oleic acid and stearic acid, and an abrasive comprising chromium oxide, can bring about good electromagnetic conversion characteristics, in particular, well balanced lumi. S/N and chroma S/N, as shown below. An additional superiority is that it may cause less fall of RF outputs after repeated traveling of the tape.

An example of the preparation of such a magnetic recording medium follows: To 100 parts by weight of Co-γ-FeO$_x$ (x=1.4 to 1.5; Hc=900 Oe; average major axis: 0.25 μm) containing silicon (Si), 12 parts by weight of a vinyl chloride/vinyl acetate/maleic anhydride copolymer (polymerization ratio=87:8:5; degree of polymerization: 600), 6 parts by weight of a polyester polyurethane resin (a product of Dainippon Ink & Chemicals, Incorporated; trade name: Crisbon 7209), 2 parts by weight of butyl stearate and 1 part by weight of conductive carbon black (average particle diameter: 10 mμm), a lubricant such as stearic acid, oleic acid or palmitic acid and an abrasive such as chromium oxide or alumina are added (in the amounts, parts by weight, as shown in Table A), and these components are well kneaded. Thereafter, an appropriate amount of a methyl ethyl ketone/cyclohexanone 7/3 mixture as a solvent and 7 parts by weight of polyisocyanate (a product of Nippon Polyurethane Industry Co., Ltd.; trade name: Colonate L-75) as a hardening agent are added to the kneaded product. Magnetic coating compositions are thus prepared.

Subsequently, the resulting magnetic coating compositions are each applied on a polyethylene terephthalate film by a conventional method, followed by magnetic field orientation, drying, and calendering, in this order. Magnetic recording mediums are thus prepared.

TABLE A

|  | Si content in iron oxide* | Stearic acid | Oleic acid |
|---|---|---|---|
| Medium 1: |  |  |  |
| Upper layer: | 0.7 | 2 | 0 |
| Lower layer: | 0.03 | 2 | 0 |
| Medium 2: |  |  |  |
| Upper layer: | 0.7 | 1 | 1 |
| Lower layer: | 0.03 | 2 | 0 |
| Medium 3: |  |  |  |
| Upper layer: | 0.7 | 0 | 2 |
| Lower layer: | 0.03 | 0 | 0 |

*% by weight based on iron oxide (Co-γ-FeO$_x$)

Characteristics of the magnetic recording mediums thus obtained were measured. Results obtained are shown in Table B.

TABLE B

| Characteristics | Medium | | |
|---|---|---|---|
|  | 1 | 2 | 3 |
| Surface roughness Ra of magnetic layer (μm): | 0.014 | 0.013 | 0.012 |
| Coersive force Hc (Oe): | 800 | 810 | 805 |
| Lumi. S/N (dB): | 0 | +0.1 | +0.3 |
| Chroma S/N (dB): | 0 | +0.2 | +0.9 |
| Travel test at 40° C., 80% RH, 50 passes: | Complete travel | Complete travel | Complete travel |
| Fall of RF output after 50 passes: | −0.3 | −0.2 | −0.3 |

Surface roughness:
Surface roughness was measured using a surface roughness analyzer (manufactured by Kosaka Kenkyusho; "SE-3FK").
Lumi. S/N:
100% white signals are inputted to a magnetic recording medium. Reproducing video signals are inputted to 925D/I (a noise meter, manufactured by Shibasoku Co.). Lumi. S/N is read from the resulting absolute noise values.
Chroma S/N:
Using a noise meter manufactured by Shibasoku Co., differences in S/N of chroma signals between samples are found in comparison with that of Medium 1.
Travel test:
Under condtions of 40° C., 80% RH, samples are made to repeatedly travel 50 times. When they repeatedly traveled 50 times without stop, samples are regarded as accepted products because of complete travel.
Fall of RF output:
Under conditions of 40° C., 80% RH, samples are made to repeatedly travel 50 times, where the difference between the RF output at the first-time travel (a signal is previously recorded on a video tape) and the Rf output at the 50th-time travel is regarded as a fall of the RF output.

The magnetic recording medium comprising;

a nonmagnetic support and provided thereon a first magnetic layer (a lower layer) and a second magnetic layer (an upper layer), wherein;

said second magnetic layer comprises i) a magnetic material comprising a cobalt-containing iron oxide having a coersive force (Hc) of from 750 to 1,200 Oe (oersted) and containing Si, ii) a binder comprising a modified vinyl chloride/vinyl acetate copolymer having a negative functional group and a modified polyurethane having a negative functional group, which are used in combination, and iii) an abrasive comprising chromium oxide, can bring about superior effects of improving, in particular, electromagnetic conversion characteristics and travel durability, as shown below.

| Components | First magnetic layer | Second magnetic layer |
|---|---|---|
| Co-γ-FeO$_x$ (x = 1.46; average major axis: 0.18 μm): | | |
| Hc | 700 | 850 |
| Si content (wt. %)* | 0.7 | 0.7 |
| Amount (parts by weight) | 100 | 100 |
| Abrasive: | | |
| Type | — | Cr$_2$O$_3$ |
| Particle diameter | — | 0.2 μm |
| Amount (parts by weight)** | — | 3 |
| Modified vinyl chloride/vinyl acetate copolymer having a negative functional group (sulfonic acid group content: 0.25%; degree of polymerization: 400): | 15 | 15 |
| Modified polyurethane having a negative functional group (sulfonic acid group content: 0.1%; average molecular weight: 60,000): | 5 | 5 |
| Polyisocyanate (a product of Nippon Polyurethane Industry Co., Ltd.; trade name: Colonate L-75): | 7 | 7 |
| Stearic acid: | 2 | 2 |
| Butyl stearate: | 2 | 2 |
| Conductive carbon (particle diameter: 10 μm): | 1 | 1 |
| Surface roughness Ra before calendering (μm): | 0.012 | |
| Lumi. S/N (dB): | 0 | |
| Chroma S/N (dB): | 0 | |
| Fall of RF output after travel of 59 passes under conditions of 40° C., 80% RH (dB): | −0.1 | |

*Based on the magnetic material.
**The same applies to the subsequent components.

EXAMPLES

The present invention will be described below in greater detail by giving Examples and Comparative Examples.

EXAMPLES 1 to 7 & COMPARATIVE EXAMPLES 1 to 3

Magnetic coating compositions with the formulation as shown in Tables 1 and 2 were prepared by a conventional method, using the abrasives with the characteristics as shown in Table 3.

TABLE 1

(Magnetic coating composition for uppermost magnetic layer)

| Components | Proportion (pbw) |
|---|---|
| Co-γ-Fe$_2$O$_3$ (Hc = 900 Oe; BET value: 50 m$^2$/g; average particle diameter: 0.2 μm): | 100 |
| Vinyl chloride resin containing potassium sulfonate (a product of Nippon Zeon Co., Ltd.; trade name: "MR110"): | 10 |
| Polyester polyurethane (a product of Nippon Polyurethane Industry Co., Ltd.; trade name: "N3132"): | 5 |
| Abrasive A, Cr$_2$O$_3$ | 5 |
| Carbon black (average particle diameter: 40 μm) | 1 |
| Myristic acid | 1 |
| Stearic acid | 1 |
| Butyl stearate | 1 |
| Methyl ethyl ketone | 100 |
| Cyclohexane | 100 |
| Toluene | 100 |

The above components for the magnetic coating compositions were kneaded and well dispersed in the mixtures, followed by addition of 5 parts by weight of "Colonate L", a product of Nippon Polyurethane Industry Co., Ltd. Magnetic coating compositions were thus prepared.

TABLE 2

(Magnetic coating composition for lower magnetic layer)

| Components | Proportion (pbw) |
|---|---|
| Co-γ-Fe$_2$O$_3$ (Hc = 700 Oe; BET value: 38 m$^2$/g; average particle diameter: 0.2 μm): | 100 |
| Vinyl chloride resin containing potassium sulfonate (a product of Nippon Zeon Co., Ltd.; trade name: "MR110"): | 10 |
| Polyester polyurethane (a product of Nippon Polyurethane Industry Co., Ltd.; trade name: "N3132"): | 5 |
| Abrasive B, alumina | 5 |
| Carbon black (average particle diameter: 40 μm) | 1 |
| Myristic acid | 1 |
| Stearic acid | 1 |
| Butyl stearate | 1 |
| Methyl ethyl ketone | 100 |
| Cyclohexane | 10 |
| Toluene | 100 |

The above components for the magnetic coating composition were kneaded and well dispersed in the mixture, followed by addition of 5 parts by weight of "Colonate L", a product of Nippon Polyurethane Industry Co., Ltd. Magnetic coating compositions were thus prepared.

Next, the magnetic coating compositions thus obtained were each applied layer-by-layer on a polyethylene terephthalate film so as to give the uppermost magnetic layer and lower layer with varied thickness as shown in Table 3.

EXAMPLES 8 to 10

Examples 2, 3 and 4 were repeated to give samples of Examples 8, 9 and 10, respectively, except that the abrasive comprising chromium oxide, used in Examples 2, 3 and 4, was replaced with an abrasive comprising α-Al$_2$O$_3$ (alumina).

EXAMPLE 11

Example 2 was repeated to give a sample of Example 11, except that the magnetic powder used in the uppermost magnetic layer was replaced with silicon-treated magnetic powder (silicon content: 0.5 part by weight based on 100 parts by weight of the magnetic powder; Hc: 900 Oe; BET value: 50 m²/g; average particle diameter: 0.2 μm).

EXAMPLE 12

Example 11 was repeated to give a sample of Example 12, except that 1 part by weight of the stearic acid used in the uppermost magnetic layer was replaced with 1 part by weight of oleic acid.

EXAMPLE 13

Example 11 was repeated to give a sample of Example 13, except that 10 parts by weight of the vinyl chloride resin containing potassium sulfonate and 5 parts by weight of the polyester polyurethane, used in the uppermost magnetic layer, were replaced with 5 parts by weight of polyurethane containing sodium sulfonate (UR8300; a product of Toyobo Co., Ltd.), the modified polyurethane having a negative functional group.

EXAMPLE 14

Example 11 was repeated to give a sample of Example 14, except that the magnetic powder in the uppermost magnetic layer was used in an amount of 90 parts by weight, and 10 parts by weight of magnetic chromium oxide (Hc: 700 Oe; BET value: 35 m²/g; average particle diameter: 0.3 μm) was added in the uppermost magnetic layer.

EXAMPLES 15 and 16

Example 14 was repeated to give a sample of Examples 15 and 16, respectively, except that, of the magnetic powder used in the uppermost magnetic layer, the silicon-treated magnetic powder was replaced with aluminum-treated Co-γ-Fe$_2$O$_3$ (aluminum content: 0.3 part by weight based on 100 parts by weight of the magnetic powder; Hc: 900 Oe; BET value: 50 m²/g; average particle diameter: 0.2 μm) and silicon- and aluminum-treated Co-γ-Fe$_2$O$_3$ (silicon and aluminum content: 0.3 part by weight and 0.1 part by weight, respectively, based on 100 parts by weight of the magnetic powder; Hc: 900 Oe; BET value: 50 m²/g; average particle diameter: 0.2 μm), respectively.

On the samples thus obtained, the electromagnetic conversion characteristics (Y-CN), sliding noise, and degree of milky-white foreign matters adhered to the magnetic head were measured.

Table 3 shows measured values for the thickness of the uppermost magnetic layer and that of the lower layer, the average particle diameter of the abrasive used, and the rate of recurrence of the coarse particles. Tables 4 and 5 show results obtained as a result of the measurement of electromagnetic conversion characteristics and so forth.

TABLE 3

| | Characteristics: | | |
|---|---|---|---|
| | Average particle diameter (μm)/ rate of recurrence (%) of coarse particle*, of abrasives | | Uppermost layer thickness/lower layer thickness |
| | Abrasive A | Abrasive B | (μm) |
| Example 1: | 0.3/5.0 | 0.3/5.0 | 1.0/2.5 |
| Example 2: | 0.2/3.5 | 0.5/7.3 | 0.5/2.5 |
| Example 3: | 0.2/3.5 | 0.5/7.3 | 1.0/2.0 |
| Example 4: | 0.2/3.5 | 0.5/7.3 | 1.5/2.0 |
| Example 5: | 0.1/2.0 | 0.5/7.3 | 1.0/2.5 |
| Example 6: | 0.2/3.5 | 0.8/11.9 | 1.0/2.5 |
| Example 7: | 0.2/3.5 | 0.5/7.3 | 2.0/2.5 |
| Comparative Example | | | |
| 1: | 0.5/7.3 | 0.8/11.9 | 1.0/2.5 |
| 2: | 0.2/3.5 | 0.2/3.5 | 1.0/2.5 |
| 3: | 0.3/5.0 | — | 4.0/0 |

*Particles with a particle diameter of μm or more.

TABLE 4

| | Characteristics: | | | | |
|---|---|---|---|---|---|
| | Y-CN (dB) | | | Sliding noise (dB) | |
| | 4.5 M | 6.0 M | 8.0 M | 1 pass | 10 passes |
| Example 1: | 1.7 | 2.2 | 2.4 | 1.0 | 2.6 |
| Example 2: | 1.8 | 2.3 | 2.6 | 1.0 | 2.6 |
| Example 3: | 1.9 | 2.4 | 2.7 | 1.2 | 2.3 |
| Example 4: | 1.9 | 2.5 | 2.8 | 1.2 | 2.2 |
| Example 5: | 2.0 | 2.6 | 2.9 | 1.4 | 2.5 |
| Example 6: | 1.8 | 2.3 | 2.5 | 1.2 | 1.7 |
| Example 7: | 1.9 | 2.4 | 2.7 | 1.8 | 4.8 |
| Comparative Example | | | | | |
| 1: | 0 | 0 | 0 | 1.1 | 2.0 |
| 2: | 1.9 | 2.4 | 2.6 | 2.8 | 7.5 |
| 3: | 1.7 | 2.3 | 2.4 | 2.7 | 10.3 |
| Example 8: | 1.7 | 2.2 | 2.4 | 1.1 | 2.7 |
| Example 9: | 1.8 | 2.3 | 2.5 | 1.3 | 2.4 |
| Example 10: | 1.8 | 2.3 | 2.6 | 1.3 | 2.3 |
| Example 11: | 2.0 | 2.5 | 2.7 | 1.0 | 2.5 |
| Example 12: | 2.0 | 2.5 | 2.6 | 1.1 | 2.6 |
| Example 13: | 2.2 | 2.7 | 3.0 | 1.1 | 2.5 |
| Example 14: | 2.1 | 2.7 | 2.9 | 0.7 | 2.0 |
| Example 15: | 2.1 | 2.6 | 2.8 | 0.9 | 2.2 |
| Example 16: | 2.3 | 2.8 | 3.1 | 0.6 | 1.9 |

TABLE 5

| | Characteristics: Milky-whiteness | |
|---|---|---|
| | Evaluation | Fall of 8.0 MHz output (dB) |
| Example 1: | A | −0.6 |
| Example 2: | A | −0.3 |
| Example 3: | A | −0.4 |
| Example 4: | A | −0.5 |
| Example 5: | A | −0.4 |
| Example 6: | A | −0.2 |
| Example 7: | B | −1.5 |
| Comparative Example | | |
| 1: | A | −0.3 |
| 2: | C | −3.0 |
| 3: | C | −3.5 |
| Example 8: | A | −0.5 |
| Example 9: | A | −0.6 |
| Example 10: | A | −0.6 |
| Example 11: | A | −0.4 |
| Example 12: | A | −0.4 |
| Example 13: | A | −0.5 |
| Example 14: | A | −0.2 |
| Example 15: | A | −0.3 |
| Example 16: | A | −0.1 |

A: No contamination of the head at all.
B: Contamination of the head is seen.
C: Contamination of the head is quite seriously seen.

As is evident from Tables 4 and 5, controlling the particle diameter of the abrasives used in the uppermost magnetic layer and lower layer and the coating thickness of the respective layers to have the values as defined in the present invention brought about a great improvement in the sliding nose that could not be solved by the conventional mediums comprised of a single layer, in spite of the particularly excellent CN at the high frequency bands. It also brought about a remarkable improvement in the prevention of the contamination of the head.

Methods of measurement of the characteristics in Examples and Comparative Examples

Y-CN (1) A magnetic recording tape is quickly fed forward until it is wound up to a wind thickness of about 3 mm, and a signal of 6 MHz is recorded from that point for 10 minutes. This is repeated three times. The recording level is set to a value corresponding to +20% of an optimum recording level of a comparative tape.

(2) At the part on which the 6 MHz signal has been recorded in the above (1), signals of 4.5, 6 and 8 MHz are recorded for 3 minutes for each. The recording levels are set to values corresponding to +20% of an optimum recording level of a comparative tape. RF reproduction outputs (called C) and C/N are compared with values of the comparative tape.

Sliding noise (i) Recorded signals are reproduced without traveling of the tape, and system noise is measured using a spectrum analyzer.

(ii) Reproduction is carried out for 1 minute on a sample tape, and sliding noise is measured using a spectrum analyzer (1 pass).

(III) Reproduction is carried out ten times on a sample tape at intervals of 1 minute (10 passes).

(iv) In respect of the noise levels around 9 MHz, values of noise for each of 1 pass and 10 passes are read on the basis of the system noise (0 dB). * In all instances, the measurement is carried out under conditions of a room temperature of 20±2° C. and a relative humidity of 10±2%, and in the state that the top cover of the VTR has been removed.

What is claimed is:

1. A magnetic recording medium comprising a nonmagnetic support and provided thereon a plurality of magnetic layers comprising ferromagnetic powder dispersed in a binder, wherein an uppermost magnetic layer of the magnetic layers contains an abrasive with an average particle diameter of not more than 0.3 $\mu$m, a magnetic layer other than the uppermost magnetic layer contains an abrasive with an average particle diameter of not less than 0.3 $\mu$m, an amount of abrasive particles having a particle diameter of not less than 1 $\mu$m is not more than 5% of the abrasive contained in the uppermost magnetic layer, and an amount of abrasive particles having a particle diameter of not less than 1 $\mu$m is not less than 5% of the abrasive contained in the layer other than the uppermost magnetic layer.

2. A magnetic recording medium as claimed in claim 1, wherein thickness of the uppermost magnetic layer is 0.1 to 1.5 $\mu$m.

3. A magnetic recording medium as claimed in claim 1, wherein, in the uppermost magnetic layer, an amount of abrasive is 0.1 to 20 wt % of an amount of the ferromagnetic powder.

4. A magnetic recording medium as claimed in claim 1, wherein, in the layer other than the uppermost magnetic layer, an amount of abrasive is 0.1 to 20 wt % of an amount of the ferromagnetic powder.

5. A magnetic recording medium as claimed in claim 1, wherein the ferromagnetic powder in the uppermost magnetic layer is cobalt-containing ironoxide containing Si having a coersive force of 750 to 1,200 Oe.

6. A magnetic recording medium as claimed in claim 5, wherein the cobalt-containing iron oxide contains 0.1 to 2.0 wt % of Si to the ferromagnetic powder.

7. A magnetic recording medium as claimed in claim 1, wherein the uppermost magnetic layer contains oleic acid or steric acid.

8. A magnetic recording medium as claimed in claim 5, wherein the uppermost magnetic layer contains a modified vinyl chloride/vinyl acetate copolymer having a negative functional group and a modified polyurethane having a negative functional group in combination as a binder.

9. A magnetic recording medium as claimed in claim 1, wherein the uppermost magnetic layer contains a chromium oxide as the abrasive.

10. A magnetic recording medium as claimed in claim 7, wherein the uppermost magnetic layer contains a chromium oxide as the abrasive.

11. A magnetic recording medium as claimed in claim 1, wherein the ferromagnetic powder the uppermost magnetic layer is surface treated with Al or Si and the uppermost magnetic layer contains a magnetic chromium oxide.

* * * * *